United States Patent [19]

Kobayashi et al.

[11] Patent Number: 5,668,632

[45] Date of Patent: Sep. 16, 1997

[54] METHOD OF MEASURING THE SOILING OF FLOORING SURFACES

[75] Inventors: Shozaburo Kobayashi, Takarazuka; Yasunobu Shimomura, Osaka, both of Japan

[73] Assignee: Kabushiki Kaisha Shimomura Komuten, Osaka, Japan

[21] Appl. No.: 527,375

[22] Filed: Sep. 13, 1995

[30] Foreign Application Priority Data

Oct. 13, 1994 [JP] Japan .................................. 6-275765
Sep. 5, 1995 [JP] Japan .................................. 7-254540

[51] Int. Cl.⁶ .................................................. G01J 3/46
[52] U.S. Cl. .......................... 356/402; 356/408; 250/226
[58] Field of Search ................... 356/402–411, 237–238, 356/243; 250/226

[56] References Cited

U.S. PATENT DOCUMENTS 4,298,282  11/1981  Williams ........................... 356/243
4,464,054   8/1984  Karras et al. ..................... 356/406

OTHER PUBLICATIONS

"Fundamentals of Carpet Maintenance–An Introduction to Carpet Cleaning Technology," by Eric M. Brown, 1st Edition 1982, Published by P.A. Brown & Associates, W. Yorkshire, U.K., pp. 6–33.

*Primary Examiner*—K. Hantis
*Attorney, Agent, or Firm*—Koda and Androlia

[57] ABSTRACT

A new method of measuring the soiling of floor surfaces or the like, capable of numerically and objectively measuring and grasping the soiling of floor surfaces and wall surfaces, in particular, the soiling of fiber floors, such as carpet floors, comprising the following steps: a step of illuminating a measurement surface of a floor surface in all directions by using diffused light from a diffusion chamber and a diffusion plate, a step of receiving light reflected by the measurement surface at the opening end of an optical fiber bundle disposed in the direction perpendicular to the measurement surface, a step of obtaining a color difference value between the surface color of the measurement surface obtained by measuring the received light and the surface-color of a standard plate obtained by making measurement in the similar way, and a step of numerically measuring the soiling of the floor surface depending on the change with time in the color difference value.

6 Claims, 5 Drawing Sheets

METHOD OF MEASURING THE SOILING OF FLOORING SURFACES

BACKGROUND OF THE INVENTION

1. Field of the Invention

The present invention relates to a method of numerically and objectively measuring the soiling of floor surfaces and wall surfaces (hereinafter referred to as "floor surfaces or the like") of office buildings, hotels, large stores, hospitals, ships, airplanes, etc., in particular, the soiling of fiber floors such as carpets, and a floor surface cleaning control method and a floor surface cleaning evaluation method by using the measurement method.

2. Prior Art

The cleaning of office buildings, hotels, hospitals and other large buildings is often entrusted to cleaning service companies because of lack of time or other reasons. The purpose of cleaning is to maintain sanitary environments and good appearances by removing soil. Regarding the maintenance of sanitary environments, control standards have been specified by the so-called "Building Control Rule" (a rule for ensuring sanitary environments in buildings) and it can be said that standards to be observed for the present are available. However, regarding the maintenance of visual appearances, in particular, the removal of soil, standards to be used for an objective guide and measurement methods have not yet been established at all. For this reason, regarding the removal of soil at the time of the inspection and control of cleaning, so-called input control is used inevitably in actual situations, wherein inspection and control are performed by attaching importance to cleaning manuals, that is, depending on whether cleaning processes, time elapsed, etc. are proper or not, rather than the degree of soiling.

Contrary to the above description, an attempt has been made recently to measure the light reflectivity of surfaces to be cleaned, such as floor surfaces or the like (the surfaces are those to be cleaned, such as floor surfaces, wall surfaces and ceiling surfaces, including not only smooth flat surfaces but also unsmooth surfaces represented by fiber floor surfaces. In the disclosure described hereinafter, such surfaces are abbreviated to "floor surfaces or the like." When the term "surface" is used in relation to measurement methods, the term "measurement surface" is used.) in order to numerically and objectively grasp the soiling of surfaces. However, the light reflectivity changes significantly depending on not only the soiling conditions of the floor surfaces or the like but also other surface conditions of the floor surfaces or the like, in particular, the roughness of the surfaces. In particular, in the case of a fiber floor, such as a carpet, the reflection characteristic thereof is complicated and the color thereof appears in different shades of color depending on the viewing direction. For this reason, even if the light reflectivity of such a floor surface is decreased by soil, the light reflectivity may increase if the surface roughness is decreased by wear for example. The soiling is therefore not necessarily related to the change with time in light reflectivity. In addition, the light reflectivity cannot indicate any change in hue caused by soil, an important factor for maintaining good appearances. Because of these reasons, it is inappropriate and difficult to measure and grasp the soiling of the floor surfaces or the like by using light reflectivity, in particular, when unsmooth fiber floors, such as carpets, are used.

SUMMARY OF THE INVENTION

Accordingly, the objects of the present invention are to provide a new method of measuring the soiling of floor surfaces or the like, in particular, a method capable of numerically and objectively grasping the soiling of fiber floors, and a new cleaning control method of determining the intervals for cleaning the floor surfaces or the like by using the soiling measurement method and of evaluating the condition of soil removal by cleaning.

To achieve the above-mentioned objects, the present invention comprises the following steps: a step of illuminating a measurement spot of a floor surface or the like, in particular, a fiber floor surface in all directions within an optically shielded space by using diffused light, a step of receiving reflected light in the direction perpendicular to the floor surface or the like, a step of obtaining a color difference value between the surface color of the floor surface or the like obtained by measuring the received light and the surface color of a standard plate obtained by making measurements in the similar way, and a step of numerically measuring and indicating the soiling of the floor surface or the like depending on the change with time in the color difference. In addition, the present invention provides a method of measuring the soiling of the floor surface or the like, the method being characterized that the soiling of the floor surface or the like is numerically measured and indicated by using the color difference between the surface color of the floor surface or the like measured as described above and the surface color measured after a predetermined period at the same spot of the floor surface or the like.

Furthermore, the present invention provides a cleaning control method for a floor surface or the like, being characterized that the floor surface or the like is cleaned when the change with time in the color difference value obtained by the above-mentioned measurement method exceeds a predetermined value, or when the color difference of the surface color of the floor surface or the like obtained by the above-mentioned measurement method before and after a certain elapsed period exceeds a predetermined value. Moreover, the present invention provides a method of evaluating the cleaning of a floor surface or the like, being characterized that the condition of soil removal by cleaning the floor surface or the like is numerically evaluated by the change in the color difference value obtained by the above-mentioned measurement method before and after cleaning, or by the degree of color difference between surface colors before and after cleaning.

In the method of measuring the soiling of floor surfaces or the like, a measurement surface of a floor surface or the like, is illuminated in all directions within an optically shielded space by diffused light, reflected light is received in the direction perpendicular to the measurement surface, that is, among the light beams reflected by the measurement surface, the light beams reflected in the direction perpendicular to the measurement surface are received, then the received light is usually led to an optical fiber directly, as shown in an embodiment-described below. Then the color (the color of light reflected by an opaque object) of the measurement surface of the floor surface or the like is measured by a sensor. With this method, the surface color of the floor surface or the like can be measured without being affected by the surface conditions of the floor surface or the like, and the surface color of a fiber floor such as a carpet can therefore be measured without hindrance. In this case, the standard light C (daylight) specified in JIS Z8720 is usually used. However, it is not necessary that the light is limited to the standard light. Other standard colors specified in JIS Z8720 can be used depending on the measurement position of the floor surface or the like, for example.

The color difference between the surface color of the measurement surface of a floor surface or the like, measured by the above-mentioned received light and the surface color of the standard plate measured in the similar way (the measurement and calculation of the surface color and color difference are detailed later in the description of an embodiment) varies in accordance with the daily accumulation of soil onto the floor surface or the like or in accordance with the cleaning (removal of soil) of the floor surface or the like as indicated by data in the description of the embodiment explained later. The change with time in the above-mentioned color difference value is related to the accumulation or removal of soil. Accordingly, by obtaining change with time in the above-mentioned color difference, for example, the range or rate of change in the color difference value on a floor surface of an office building, obtained between a measurement performed at a certain time and a measurement performed six months thereafter, or by obtaining the change in color difference value on a carpet floor surface before and after cleaning, the degree of soiling of the floor surface or the like can be measured and indicated numerically.

In addition, in the method of measuring the soiling of floor surfaces or the like according to the present invention, the color difference between the surface color of the measurement surface of a floor surface or the like, measured by using the above-mentioned received color and the surface color measured at the same spot of the floor surface or the like after a lapse of a certain period or after cleaning is related to the accumulation or removal of soil in-the period. In this way, the degree of soiling of the floor surface or the like can be measured and indicated numerically by using the color difference value.

Furthermore, since the soiling of floor surfaces or the like can be measured numerically by using the method of the present invention, the cleaning control of the floor surfaces or the like can be performed on the basis of numeric and objective standards. In other words, as described in claims 3 and 4 of the present invention, control is possible by cleaning the floor surface when the change with time in the above-mentioned color difference value exceeds a predetermined value, or when the color difference value obtained at the same spot and between the measurement performed at a certain time and the measurement after a lapse of a certain period exceeds a predetermined value, that is, when the soiling of the floor surface or the like grasped numerically exceeds a predetermined value. The soiling of the floor surface can therefore be determined on the basis of numerical and objective standards, instead of determining the timing of cleaning the floor surface on the basis of conventional subjective standards regarding the soiling of the floor surface. In the similar way, the effect of cleaning, that is, the condition of soil removal at the time of cleaning of floor surfaces or the like can be evaluated numerically and objectively as described in claims 5 and 6 of the present invention, instead of subjective evaluation performed conventionally.

The present invention will be detailed below by referring to the accompanying drawings.

DETAILED DESCRIPTION OF THE PREFERRED EMBODIMENTS

Figure 1:
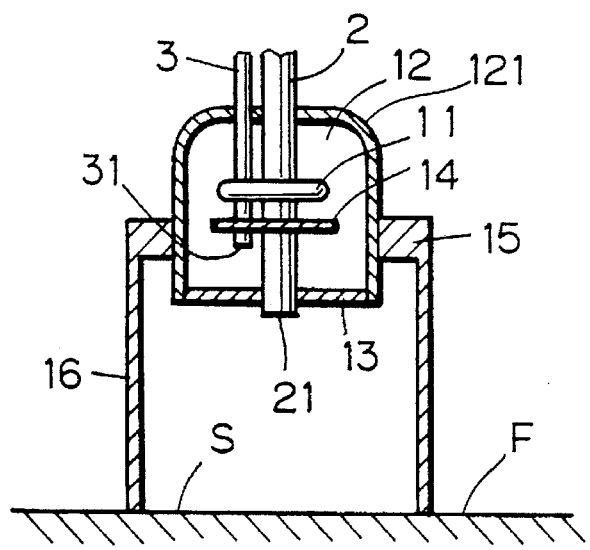
FIG. 1 is a view (sectional view) illustrating an example of an illuminating/light-receiving device of the present invention.

How to obtain the value of color difference between the surface color of the measurement surface of a floor surface or the like and the surface color of a standard plate according to the present invention is explained as described below. FIG. 1 is a view (sectional view) illustrating an example of an illuminating/light-receiving device of the present invention used for the method of measuring the soiling of floor surfaces or the like, and FIG. 2 is a block diagram of an example of a device of the present invention for measuring and calculating surface color and color difference values.

Referring to FIG. 1, an illuminating/light-receiving device 1 is equipped with a pulse xenon lamp 11 satisfying the requirements for the standard light C specified in JIS Z8720 (Standard Illuminants and Sources for Colorimetry) as a light source at the center of a diffusion chamber 12. The light from the lamp 11 is reflected by the wall surfaces of the diffusion chamber 12 in a diffusion cap 121 and diffused in all directions, and further diffused evenly through a diffusion plate 13 made of acrylic resin for example to illuminate measurement surface S of floor surface F. As a result, the measurement surface S is illuminated in all directions by diffused-light. Below the pulse xenon lamp 11 and above the diffusion plate 13, a light-shielding plate 14 is disposed to prevent undiffused direct light generated from the pulse xenon lamp 11 from illuminating the floor surface through the diffusion plate 13. In the figure, numeral 16 represents a cylindrical light-shielding cap used to shield the measurement surface S from external light. The head 15 of the cap 16 supports a diffusion cap 121.

A light-receiving optical fiber bundle 2 passes through the diffusion plate 13 in the perpendicular direction and is disposed so that the opening end 21 thereof is perpendicular to the measurement surface S. With this structure, among the illumination light beams reflected by the measurement surface S of the floor surface F, reflected light beams nearly perpendicular to the measurement surface S enter the optical fiber bundle 2 and are received. On the other hand, an optical fiber bundle 3 receiving the diffused light emitted from the pulse xenon lamp 11 is extended in parallel with the above-mentioned optical fiber bundle 2 and passes through the light-shielding plate 14. The opening end 31 of the optical fiber bundle 3 is disposed below the light-shielding plate 14 and above the diffusion plate 13. The diffused light in the diffusion chamber 12 enters the opening end 31 and is received. The illuminating/light-receiving device 1 described herein satisfies condition c of "4.3.1 Geometric conditions of illumination and light reception" of JIS Z8722 (Methods of Measurement for Colour of Reflecting or Transmitting Objects).

Figure 2:
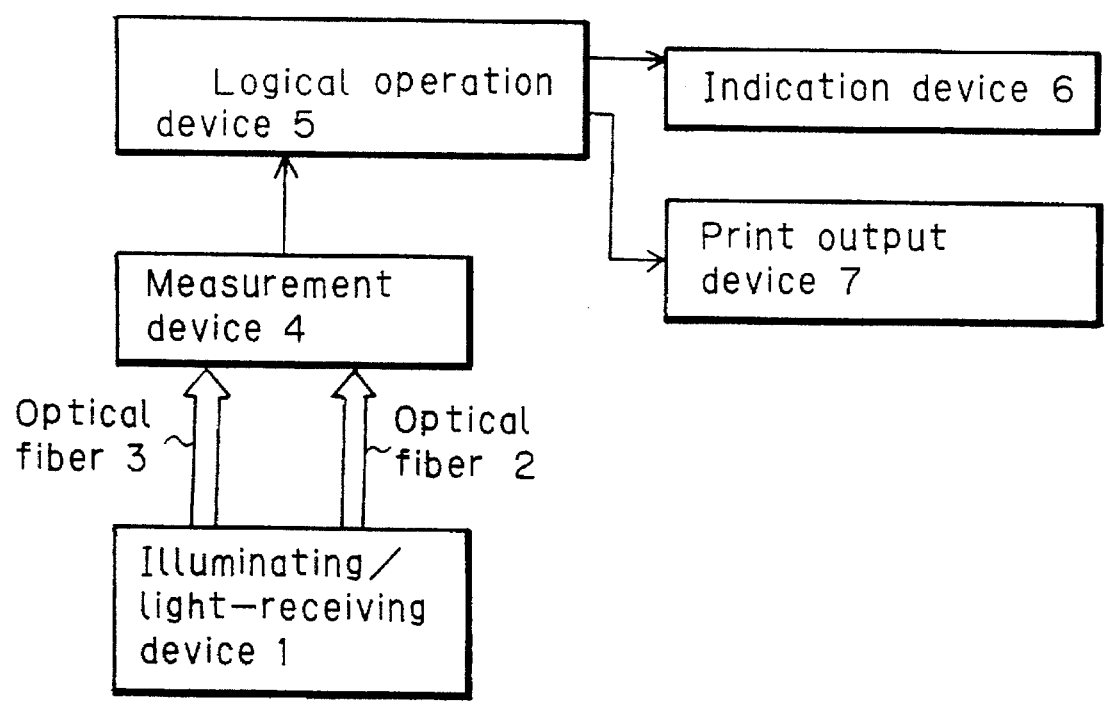
FIG. 2 is a block diagram of an example of a device of the present invention for measuring and calculating surface color and color difference values.
Figure 3:
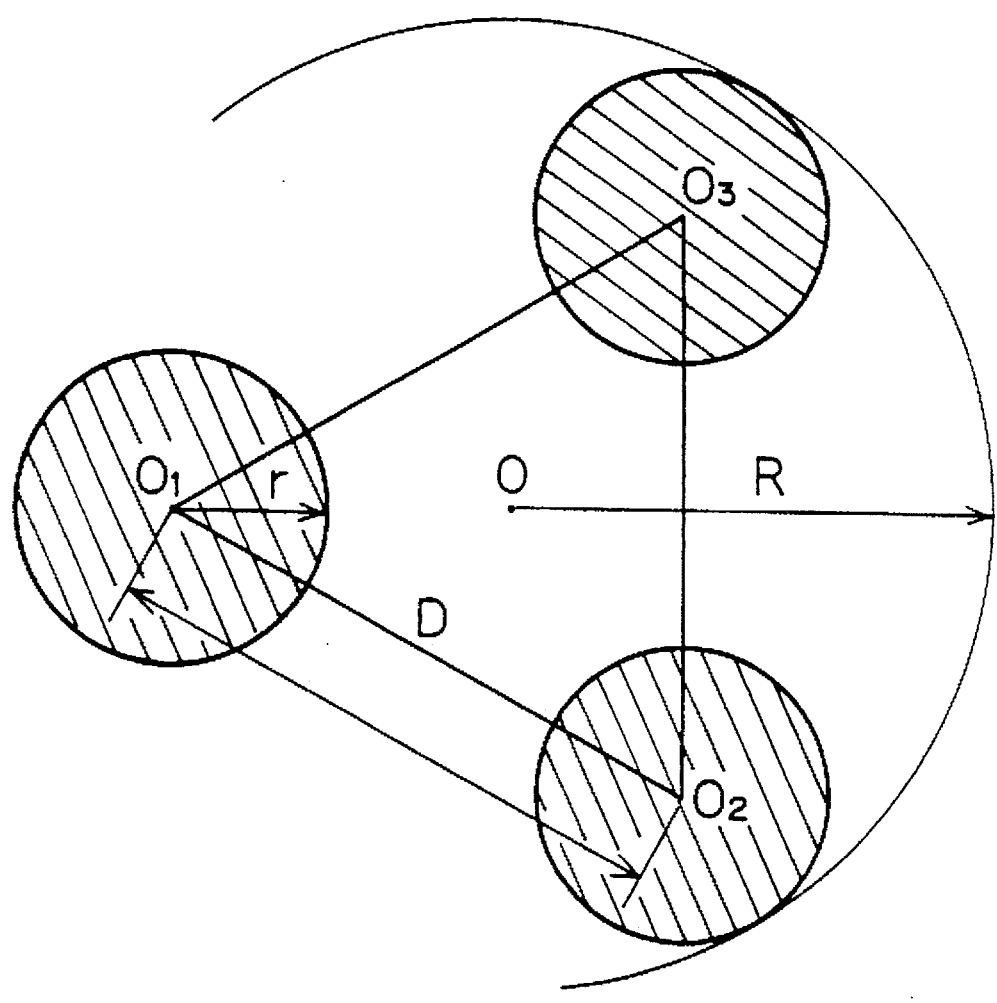
FIG. 3 is a view illustrating measurement spots.

The reflected light from the measurement surface S to which light is guided by the optical fiber bundle 2 and the diffused light of the pulse xenon lamp 11 guided by the optical fiber bundle 3 are guided to a measurement device 4 as shown in FIG. 2 and measured by a sensor (not shown) in the measurement device 4. The output of the sensor is fed to a logical operation device 5. The results of calculation (surface color range, color difference, etc.) are indicated by an indication device 6 and printed by a print output device 7.

The color of an object, obtained by the reflected light, that is, the surface color at the above-mentioned measurement surface S can be conveniently measured by the method of direct reading of tristimulus values by using a photoelectric colorimeter satisfying the conditions specified in 5.2 of JIS Z8722. Tristimulus values X, Y and Z of the XYZ color system (2-degree visual field XYZ color system) or tristimulus values $X_{10}$, $Y_{10}$ and $Z_{10}$ of the $X_{10}$ $Y_{10}$ $Z_{10}$ color system (10-degree visual field XYZ color system) are obtained from the indication of the photoelectric colorimeter. (Hereinafter, the XYZ color system and the tristimulus values X, Y and Z are used regardless of the distinction between the 2-degree visual field and the 10-degree visual field). From these tristimulus values, surface colors in various color systems, such as the Yxy color system and the L*a*b* color system, can be calculated. For example, the method of calculating the value of psychometric lightness L* and the values of psychometric chroma coordinates a* and b* from the above-mentioned tristimulus values X, Y and Z is specified in JIS Z8729 [Specification of Colour of Materials according to the CIE 1976 (L*a*b*) Space and the CIE 1976 (L*u*v*) Space] or Section 6 (Calculation Method for Colour Difference) of JIS Z8730 (Method for Specification of Colour Differences for Opaque Materials). The measurement of the tristimulus values is not limited to the above-mentioned method of direct reading of tristimulus values by using the photoelectric colorimeter, but the values can be obtained by the spectrocolorimetric method (Section 4 of JIS Z8722).

In a way similar to that described above, the surface color of the standard plate is obtained. The color difference between the surface color obtained for the measurement surface of a floor surface and the surface color obtained for the standard plate is obtained. The methods of calculating the color differences in various color systems, including the method of calculating the color differences in the L*a*b* color system, are specified in "6. Calculation Method for Colour Difference" of JIS Z8730 "Method for Specification of Colour Differences for Opaque Materials." By following these methods, color differences can be calculated. For example, the color difference in the L*a*b* color system can be calculated by using the equation described below.

$$\Delta E^*ab = [(\Delta L^*)^2 + (\Delta a^*)^2 + (\Delta b^*)^2]^{1/2}$$

wherein $\Delta E^*ab$ is a color difference In the L*a*b* color system. $\Delta L^*$, $\Delta a^*$ and $\Delta b^*$ are differences of psychometric lightness L* and psychometric chroma coordinates a* and b* between two surface colors in the L*a*b* color system, that is, between the surface color of the measurement surface of the floor surface or the like, and the surface color of the standard plate in the present case.

The above-mentioned measurements of surface colors and color differences can be done by using a commercially available chroma meter in actual practice. In this case, since the values of surface colors and color differences are measured, calculated and printed automatically, color difference values can be measured efficiently and conveniently. All measurements of the surface colors and color differences for fiber floors, that is, carpets described below were done by using the chroma meter CR-210 (R̂) made by Minolta Camera Co., Ltd. The measured values in the L*a*b* color system are indicated.

Figure 4:
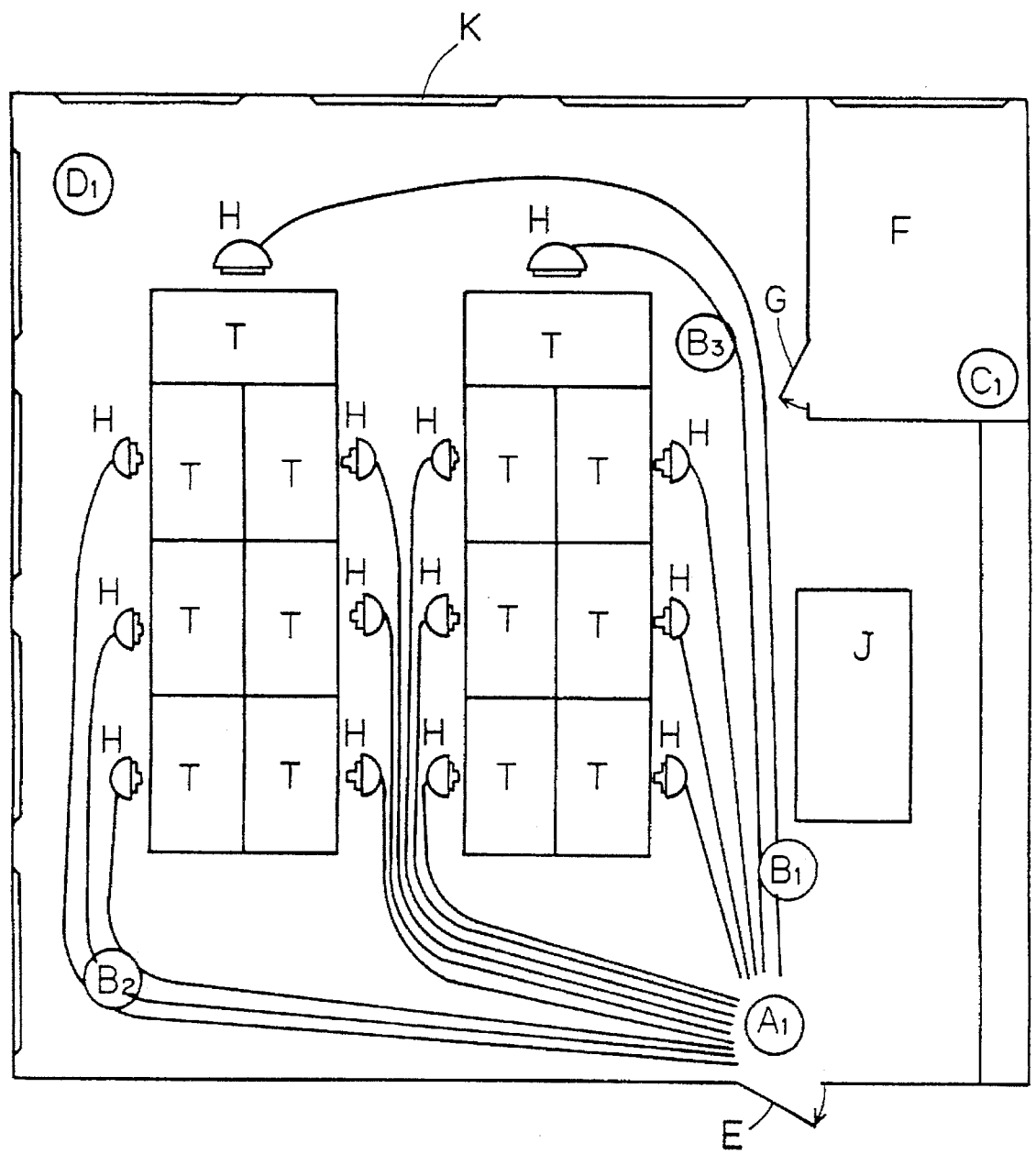
FIG. 4 is a plan view illustrating an office room with a carpet on the floor and showing the movement lines of persons.

A procedure for actually performing cleaning control of buildings by using the method of numerically measuring the soiling of floor surfaces, the method of performing cleaning control and the floor surface cleaning evaluation method described above is described below. Ordinary commercial cleaning control is defined as undertaking the cleaning of the floor surface of each room in a building, covered with a floor carpet for example, for maintaining the cleanliness of each room in an economical way. The floor surface of a room in a building, such as the floor surface shown in FIG. 4, has a plurality of spots which may differ from one another in the degree of soiling due to the use of the room (the traffic of persons). More particularly, FIG. 4 is a plan view of an office room in an office building. Letter E represents the entrance door of the room. Letters T, T, . . . represent desks, and letters H, H, . . . represent chairs. Letter F represents a reception room, letter G represents the entrance door of the reception room, letter J represents a meeting table. The movement lines in the figure show paths through which persons move. The place with many movement lines and located close to the entrance E is soiled most significantly. The whole floor surface of the room is covered with gray carpet tiles (not shown).

Six spots, $A_1$, $B_1$, $B_2$, $B_3$, $C_1$ and $D_1$ shown in FIG. 4, were selected as the sample spots for floor surface soiling measurements conducted according to the present invention. Spot $A_1$ is located close to the entrance, wherein the traffic of persons in this room is most significant and the surface thereof is soiled most severely. Spots $B_1$, $B_2$ and $B_3$ are places wherein the traffic of persons is relatively significant although the spots are away from the entrance. Spot $C_1$ is a place in the reception room, wherein there is almost no traffic of persons. Spot $D_1$ is a-place wherein there is almost no traffic of persons and direct sunlight enters through window K.

The surface colors of gray carpet tiles on the floor surface were measured at the above-mentioned six spots of $A_1$, $B_1$, $B_2$, $B_3$, $C_1$ and $D_1$ after the initial cleaning of the floor surface, 3 months after the cleaning, 6 months after the cleaning, 9 months after the cleaning, 12 months after the cleaning, after the recleaning of the floor surface 12 months after the initial cleaning, and 3 months after the recleaning. The color difference values in the L*a*b* color system between the surface colors measured as described above and the surface color of a brand-new carpet tile used as the standard plate are indicated in Table 1 and FIG. 5. The surface color of the brand-new carpet tile used as the standard plate is represented by L*: 39.67, a*: 1.31 and b*: −0.12.

TABLE 1

ΔE*ab

| Spot No. | Mark in graph | At the time of cleaning | Number of months | | | | At the time of recleaning | 3 |
| --- | --- | --- | --- | --- | --- | --- | --- | --- |
| | | | 3 | 6 | 9 | 12 | | |
| $A_1$ - | ■ | 1.75 | 3.65 | 4.72 | 5.20 | 5.22 | 1.78 | 3.66 |
| $B_1$ - | ● | 1.18 | 2.23 | 2.71 | 2.94 | 2.98 | 1.22 | 2.24 |
| $B_2$ - | ▲ | 1.20 | 2.21 | 2.51 | 2.66 | 2.68 | 1.21 | 2.21 |
| $B_3$ - | ◆ | 1.22 | 2.24 | 2.59 | 2.75 | 2.92 | 1.24 | 2.25 |
| $C_1$ - | ○ | 1.18 | 1.41 | 1.69 | 1.92 | 1.92 | 1.19 | 1.42 |
| $D_1$ - | □ | 1.22 | 1.76 | 2.02 | 2.12 | 2.12 | 1.21 | 1.78 |

Each measured value in Table 1 shown above is the arithmetic mean value of the measured values at three measurement spots having radius $r$ ($r$=25 mm in the case of the CR-210 chroma meter) as shown in FIG. 8. The lines connecting the center points $O_1$, $O_2$ and $O_3$ of the three measurement spots form a regular triangle. Distance D between any two of the center points is selected so that the ratio of the area of a circle having radius R circumscribing the three measurement spots to the area of each measurement spot is 10 to 1. Distance D between any two of center points $O_1$, $O_2$ and $O_3$ is related to the radius $r$ of the measurement spot as shown below.

$$D=3.745r$$

In the above-mentioned measurements by using the CR-210, D=94 mm is selected.

Figure 5:
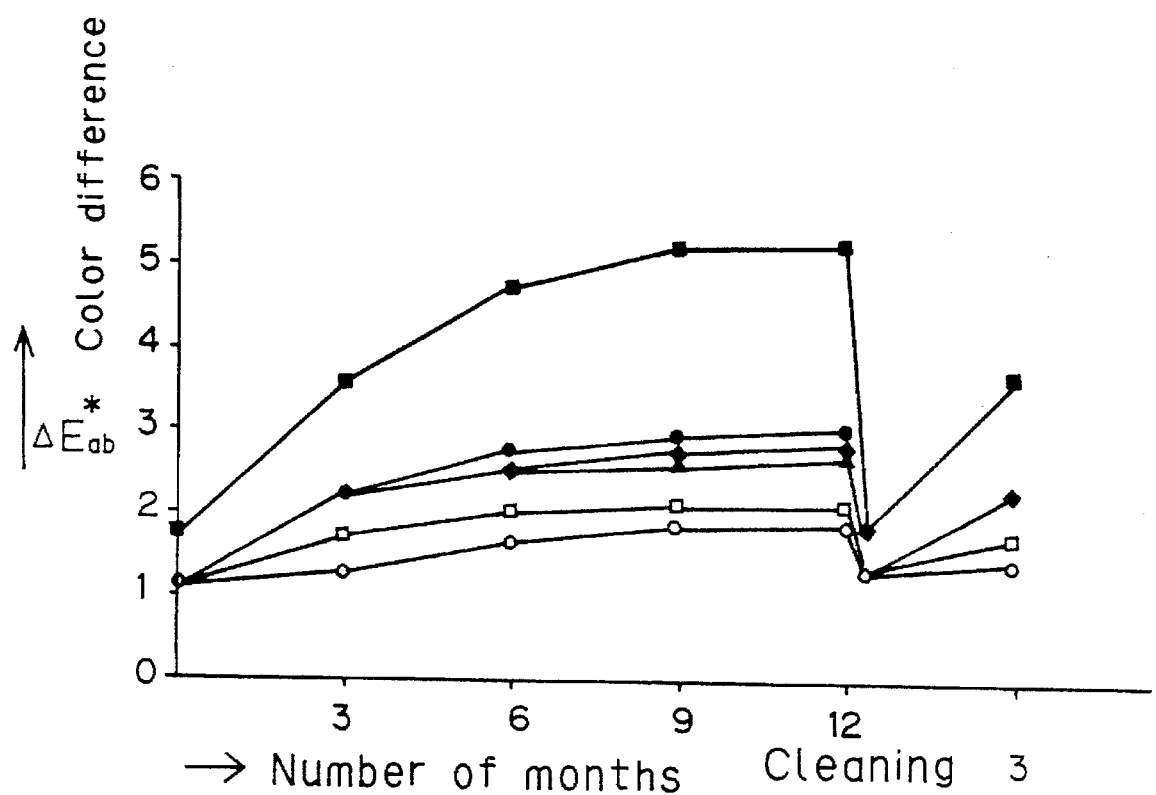
FIG. 5 is a graph indicating the change with time in color difference at the six spots shown in FIG. 4.

According to Table 1 and FIG. 5 shown above, it is understood that when only daily dry-cleaning (a vacuum cleaner equipped with a power brush is used once or twice a day to remove soil from the surface and inside of the carpet) is performed, soil accumulates at all measurement spots and color difference values increase with the passage of time, that the increase with time in the color difference value is most significant at spot $A_1$ wherein the entrance is located nearby and the traffic of persons is most significant, that the second most significant increase with time in the color difference value is obtained at spots $B_1$, $B_2$ and $B_3$, that a great color difference value of 2.0 or more is obtained between spot $A_1$ and spots $B_1$, $B_2$ and $B_3$, that a very small color difference value is obtained among spots $B_1$, $B_2$ and $B_3$, and that the change with time in the color difference value is scarce at spots $C_1$ and $D_1$.

In the following explanation, the difference in color difference values measured at the same spot or the difference in color difference values measured at different spots is referred to as "a relative difference in color difference to the least and most soiled surfaces" (hereinafter simply referred to as "a relative difference in color difference." When the above paragraph is put in another way in accordance with this definition, the relative differences in color differences between $A_1$ and $B_1$, $A_1$ and $B_2$, $A_1$ and $B_3$, $A_1$ and $C_1$, and $A_1$ and $D_1$ increase with a lapse of time.

In addition, it is understood that by recleaning the carpet tile floor surface, the color difference values at all measurement spots are decreased to the values obtained at the time of the initial cleaning, that the color difference values at spots $B_1$, $B_2$, $B_3$, $C_1$ and $D_1$ other than the value at spot $A_1$ converge to nearly the same value, that the color difference value at spot $A_1$ is decreased abruptly by the recleaning but still remains at a value larger than the values at other spots. The change with time in the color difference value of E*ab is well related to the progress and accumulation of soiling, or the condition and degree of soil removal by cleaning. As a result, the change in the degree of soiling can be indicated numerically and understood by the change with time in the color difference value.

In the L*a*b* color system, it is generally assumed that the relationship shown in Table 2 below is present between the magnitude of color difference ΔE* ab and the words for evaluating the degrees of color difference. These words are almost appropriately applicable to the relative difference in color difference to the least and most soiled surfaces. However, according to Table 1, the relative difference in color difference at spot $A_1$ already exceeded 3.0 at the time 9 months after the initial cleaning. Furthermore, the relative difference in color difference between spot $A_1$ and spot $D_1$ already exceeded 3.0. In other words, when 9 months passed after the initial cleaning, the color of the carpet at spot $A_1$ was already made different significantly by soiling from the color at the time of the initial cleaning. The color of the carpet at spot $A_1$ was also different significantly from the color of the carpet at spot $D_1$. It is evaluated that the color has reached a soiling condition which is undesirable for the maintenance of good appearances. For this reason, it is preferable that all spots are recleaned 9 months after the initial cleaning according to the measurement data shown in Table 1. If it is desired to reduce cleaning costs because of economic reasons, this is possible by performing spot cleaning at least at spot $A_1$ to decrease the relative difference in color difference between spots $A_1$ and $D_1$ to 3 or less.

TABLE 2

| Words for evaluating the degrees of color difference | ΔE*ab |
| --- | --- |
| trace | 0 to 0.5 |
| slight | 0.5 to 1.5 |
| noticeable | 1.5 to 3.0 |
| appreciable | 3.0 to 6.0 |
| much | 6.0 to 12.0 |
| very much | More than 12.0 |

As described above, according to the present invention, if it is decided that the floor surface is cleaned when the change in the color difference value exceeds a predetermined value, for example when the change in ΔE*ab exceeds 3.0, the timing of cleaning the floor surface can be determined depending on the degree of the numerically-indicated objective soiling of the floor surface. The cleaning control of floor surfaces or the like can therefore be rationalized more significantly than the conventional control.

The above-mentioned recleaning of the carpet floor is performed as follows. While detergent is sprayed, the surface of the carpet is first rubbed with a nylon brush to remove soil. Next, water is injected to the carpet surface by using an extractor-type carpet cleaner to wash the surface with water and to suck dirty water at the same time. The carpet is then dried spontaneously.

Figure 6:
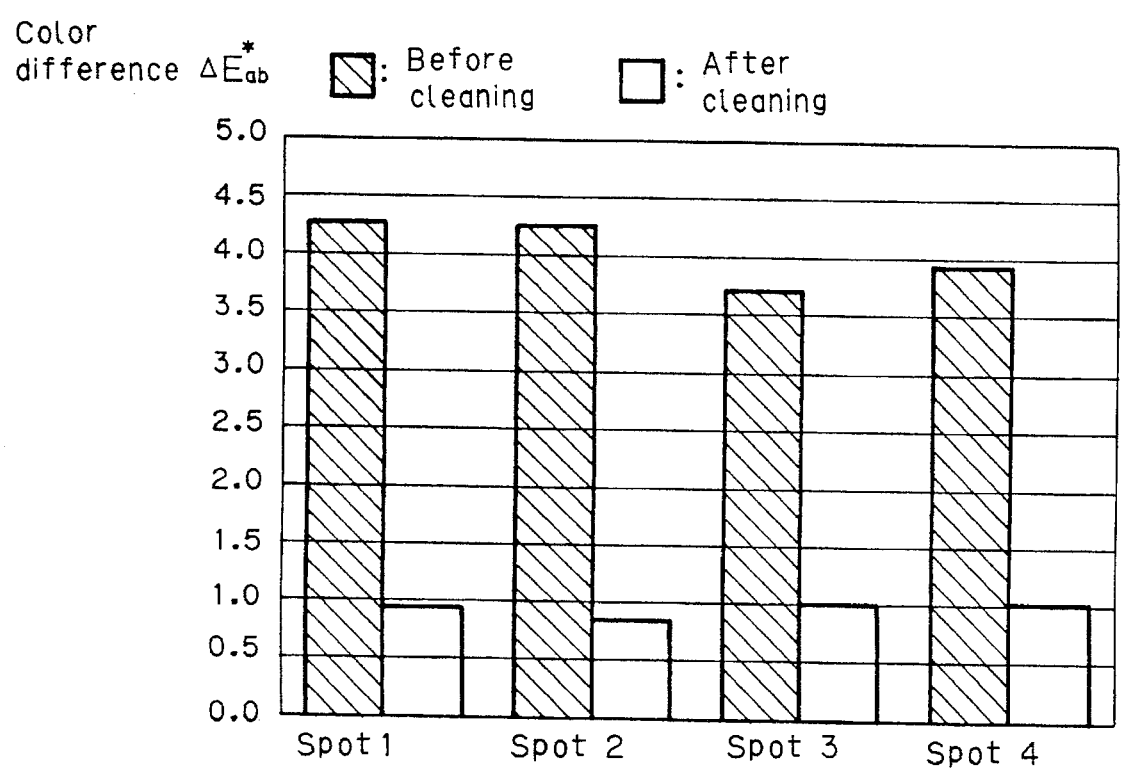
FIG. 6 is a bar graph showing the change of color difference values at four spots on the carpet floor, measured before and after cleaning.

Table 3 and FIG. 6 show the surface color values L*, a* and b* and the color difference values ΔaE*ab in comparison with the color of a new gray standard plate, measured before and after cleaning at four spots near the entrance of an office room of another office building, the floor of which is covered with gray carpet tiles. Each of the measured values described in Table 3 and FIG. 6 is the arithmetic mean value of the measured values at three spots obtained in the same way as the values shown in Table 1 and FIG. 5. cleaning is also performed in the way similar to that performed at the above-mentioned place.

cleaning and the color difference values calculated from the surface color values obtained before and after cleaning. As obviously shown in the table, the color difference values of the surface colors at the four spots before and after cleaning almost coincide with the amounts of the changes in color difference values obtained before and after cleaning and shown in Table 3.

TABLE 3

| Spot | Before cleaning | | | | After cleaning | | | | Change in color |
|---|---|---|---|---|---|---|---|---|---|
| No. | L* | a* | b* | ΔE*ab | L* | a* | b* | ΔE*ab | difference |
| 1 | 35.53 | 1.98 | 0.75 | 4.28 | 38.81 | 1.33 | 0.29 | 0.95 | 3.33 |
| 2 | 35.52 | 2.00 | 0.48 | 4.25 | 38.86 | 1.34 | 0.17 | 0.86 | 3.39 |
| 3 | 36.04 | 1.90 | 0.46 | 3.72 | 38.91 | 1.88 | 0.22 | 1.00 | 2.72 |
| 4 | 35.84 | 1.86 | 0.52 | 3.92 | 38.80 | 1.78 | 0.19 | 1.03 | 2.89 |

According to Table 3 and FIG. 6, it is well understood that the removal of soil and the change in soiling by cleaning are represented by the change in color difference ΔE*ab. Furthermore, in Table 3 and FIG. 6, attention should be paid to the fact that the change in the color difference values before and after cleaning at spots 1 and 2 is significant (3.3 to 3.4), thereby causing a significant difference in the color of the tile carpet before and after cleaning, and that at spots 3 and 4, the change in the color difference values before and after cleaning remains in a range of 2.7 to 2.9, thereby causing less significant change in the color of the carpet before and after cleaning when compared with the changes at spots 1 and 2.

This represents the difference in the effect of cleaning. More soil is removed by cleaning at spots 1 and 2 than at spots 3 and 4. In this way, the method of the present invention can numerically and objectively evaluate the effect of cleaning, that is, the removal of soil. The control of cleaning can therefore be improved from conventional so-called input control to objective control which attaches importance to the results of cleaning.

In the above-mentioned method of measuring the soiling of floor surfaces or the like according to the present invention, the soiling of floor surfaces or the like is measured as a change with time in the color difference between the surface color of the floor surface or the like and the surface color of the standard plate, and the result of the measurement is indicated. Furthermore, the method of measuring the soiling of floor surfaces or the like according to the present invention can measure the soiling of floor surfaces or the like as the color difference between the surface color of a floor surface or the like in the initial condition and the surface color of the floor surface or the like after a lapse of a certain period (including after work such as cleaning) and can indicate the result of the measurement. More particularly, since the surface color even at the same spot on the floor surface or the like changes with time because of accumulated soil, the soiling is measured as the color difference between the surface color changed with time and the initial surface color.

Table 4 shows the surface color values L*, a* and b* measured at the four spots shown in Table 3 before and after

TABLE 4

| Spot | Before cleaning | | | After cleaning | | | Color difference obtained before and after cleaning |
|---|---|---|---|---|---|---|---|
| No. | L* | a* | b* | L* | a* | b* | ΔE*ab |
| 1 | 35.53 | 1.98 | 0.75 | 38.81 | 1.38 | 0.29 | 3.37 |
| 2 | 35.52 | 2.00 | 0.48 | 38.86 | 1.34 | 0.17 | 3.40 |
| 3 | 36.04 | 1.90 | 0.46 | 38.91 | 1.88 | 0.22 | 2.88 |
| 4 | 35.84 | 1.86 | 0.52 | 38.80 | 1.78 | 0.19 | 2.98 |

As described above, in the method of the present invention, the soiling of floors or the like is measured and grasped by obtaining the change with time in the color difference between the surface color of a floor or the like and the surface color of the standard plate, or the color difference value between the surface color changed with time of a floor surface or the like and the original surface color thereof, that is, a relative value of change with time. However, as shown in Tables 1 and 3, once the relationship and conditions of a change with time in the color difference is measured and grasped, the degree of soiling can also be measured and grasped by using the color difference values themselves (absolute values) based on the relationship and conditions. This case is included in the step of numerically measuring the soiling of floors or the like by using the change with time in the color difference values, described in claim 1 of the present invention.

The methods of the present invention detailed above can be modified variously, other than the above-mentioned embodiment and modification examples. For example, although carpet floors are mainly used for explanation in the above-mentioned embodiments, the embodiment can also be applied to floors composed of PVC floor tiles, PVC floor sheets, rubber floor tiles, etc., floors composed of elastic materials,-ceramics, tiles, etc. and hard floors. The surface colors and color differences are not limited to those of the L*a*b* color system, but can be indicated by other color systems, such as the L*u*v* color system.

As detailed above, the methods of the present invention can numerically and objectively measure and indicate the soiling of floors or the like. In addition, the measurement is not affected by the surface conditions of floor surfaces or the like, such as surface roughness. For this reason, the cleaning timing and cleaning effect of floor surfaces or the like and the condition of soil removal can be determined and evaluated objectively on the basis of numerical data. As a result, the methods of the present invention can rationalize the cleaning control of floor surfaces or the like more significantly than the conventional methods.

We claim:

1. A cleaning control method for a cleaning control area of a flooring surface including a plurality of spots on the flooring surface perceived to be different from one another in the degree of soiling due to use of the flooring surface, comprising the following steps:

a step of appropriately selecting one of said plurality of spots perceived to be soiled most and another one of said plurality of spots perceived to be soiled least in the cleaning control area of the flooring surface, a step of obtaining a relative difference in color difference between the two spots, and a step of performing cleaning of said flooring surface to prevent the relative difference in color difference between said two spots from exceeding a predetermined value.

2. A cleaning control method according to claim 1, wherein the cleaning to be performed to prevent the relative difference in color difference from exceeding the predetermined value is attained by performing spot cleaning at the spot soiled most.

3. A cleaning control method according to claim 1, wherein said cleaning control area is a floor surface located substantially in a same plane.

4. A cleaning control method according to claim 1, wherein the color difference of said two spots is obtained by a method comprising the following steps:

a step of illuminating a measurement surface of each of said two spots in all directions within an optically shielded space by using diffused light, a step of receiving reflected light in the direction perpendicular to the measurement surface of each of said two spots, a step of obtaining a color difference between the surface color of each of said two spots and a surface color of a standard plate obtained by the steps of illuminating a measurement surface of the standard plate in all directions within an optically shielded space by using diffused light and receiving reflected light in a direction perpendicular to the measurement surface of the standard plate, and a step of numerically measuring and indicating changes in soiling of the measurement surface of each of said two spots with time as changes in said color difference value.

5. A cleaning control method according to claim 4, wherein the surface colors of said two sports and said standard plate and the color difference therebetween is obtained by a method wherein the surface color of the measurement surface of each of said spots, the surface color of the measurement surface of the standard plate and the color difference between the two surface colors are calculated by tristimulus values X, Y and Z in X, Y and Z color systems obtained by using a photoelectric colorimeter.

6. A cleaning control method according to claim 3, wherein the floor surface is a fiber floor surface.

* * * * *